United States Patent
Stasch

(10) Patent No.: US 10,918,240 B2
(45) Date of Patent: Feb. 16, 2021

(54) DRINKS PREPARATION MACHINE AND METHOD FOR OPERATING

(71) Applicant: QBO Coffee GmbH, Wallisellen (CH)

(72) Inventor: Rafael Stasch, Arnsberg (DE)

(73) Assignee: QBO COFFEE GMBH, Wallisellen (CH)

( * ) Notice: Subject to any disclaimer, the term of this patent is extended or adjusted under 35 U.S.C. 154(b) by 230 days.

(21) Appl. No.: 15/779,270

(22) PCT Filed: Nov. 28, 2016

(86) PCT No.: PCT/EP2016/079011
§ 371 (c)(1),
(2) Date: May 25, 2018

(87) PCT Pub. No.: WO2017/093191
PCT Pub. Date: Jun. 8, 2017

(65) Prior Publication Data
US 2018/0325308 A1 Nov. 15, 2018

(30) Foreign Application Priority Data
Dec. 3, 2015 (EP) ..................................... 15197879

(51) Int. Cl.
*A47J 31/58* (2006.01)
*A47J 31/52* (2006.01)
*A47J 31/36* (2006.01)

(52) U.S. Cl.
CPC .......... *A47J 31/58* (2013.01); *A47J 31/3633* (2013.01); *A47J 31/525* (2018.08)

(58) Field of Classification Search
CPC ................ A47J 31/4492; A47J 31/3633; A47J 31/3623; G06K 9/3241
See application file for complete search history.

(56) References Cited

U.S. PATENT DOCUMENTS 9,198,535 B2 * 12/2015 Righetti .................. A47J 42/40
9,261,175 B2 2/2016 Blagotinsek et al.
(Continued)

FOREIGN PATENT DOCUMENTS

CN 101991358 3/2011
CN 101991358 A * 3/2011
(Continued)

OTHER PUBLICATIONS

English translation of Chinese Office Action dated Dec. 10, 2019, Application No. 201680069929.7, 11 pages.
(Continued)

*Primary Examiner* — Sarang Afzali
(74) *Attorney, Agent, or Firm* — Rankin, Hill & Clark LLP

(57) ABSTRACT

A beverage-making machine having a housing that has a capsule insertion opening through which a portion capsule is inserted and having a brewing module having a first brewing module part and a second brewing module part that is movable relative to the first brewing module part. A brewing chamber can be formed by the first and second brewing module parts, the brewing chamber at least partly surrounding the portion capsule which is in a brewing position during the brewing process in order to brew a brewed beverage and discharge same out of the portion capsule. The beverage-making machine also has an electric drive for moving the second brewing module part relative to the first brewing module part and a controller for controlling the electric drive. The controller determines the current position of the second brewing module part relative to the first brewing module part at all times.

15 Claims, 6 Drawing Sheets

(56) References Cited

U.S. PATENT DOCUMENTS

2007/0034085 A1 2/2007 Wang
2011/0315020 A1* 12/2011 Sturcken ............. A47J 31/3604
                                                                99/280
2013/0152797 A1 6/2013 Mori

FOREIGN PATENT DOCUMENTS

| CN | 102334912 | | | 2/2012 |
|----|-----------|---|---|--------|
| CN | 104771077 | | | 7/2015 |
| CN | 104771077 | A | * | 7/2015 |
| EP | 2 608 708 | | | 2/2016 |
| EP | 3 028 608 | | | 6/2016 |
| WO | 2008/105017 | | | 9/2008 |
| WO | 2010/118544 | | | 10/2010 |
| WO | 2015/039258 | | | 3/2015 |
| WO | 2015/048914 | | | 4/2015 |

OTHER PUBLICATIONS

English translation of International Preliminary Report on Patentability dated Jun. 5, 2018 (Jun. 5, 2018), Application No. PCT/EP2016/079011, 7 pages.

* cited by examiner

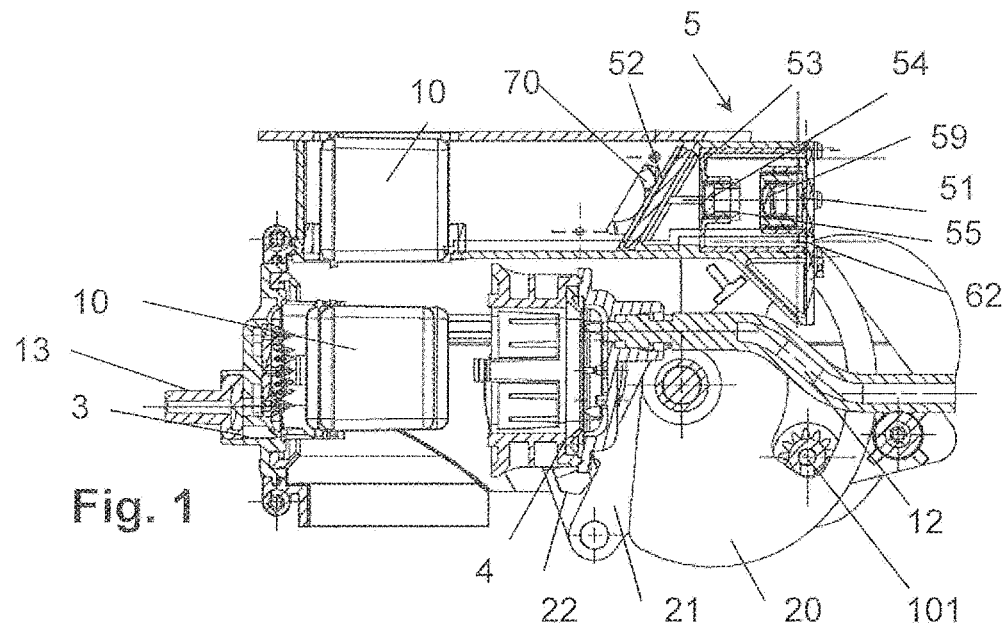
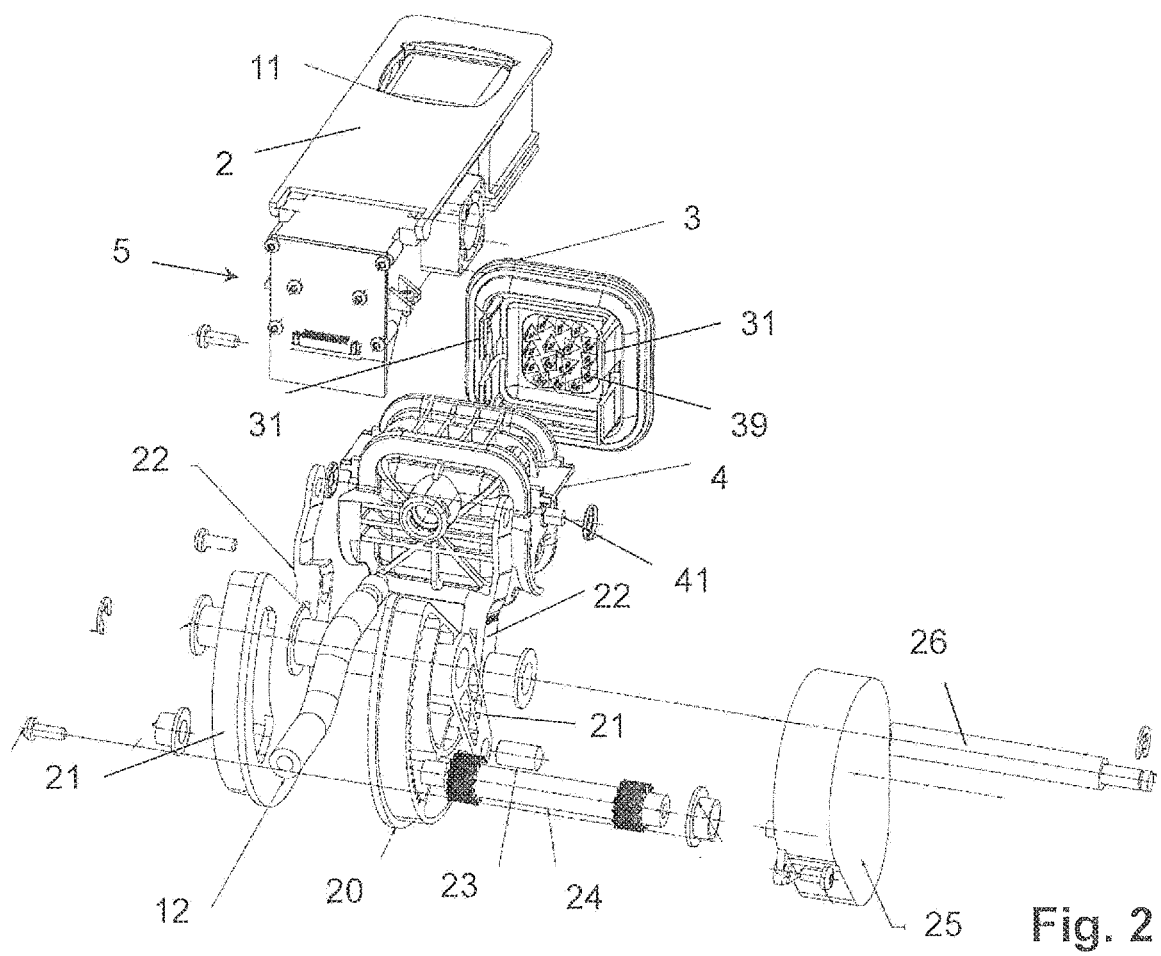

DRINKS PREPARATION MACHINE AND METHOD FOR OPERATING

BACKGROUND OF THE INVENTION

Field of the Invention

The invention relates to the field of appliances for preparing hot and/or cold drinks. It especially relates to a drinks preparation machine for preparing a drink from a portion capsule.

Description of Related Art

Drinks preparation machines that use an extraction material that is brought into a portion capsule are known, for example, as coffee machines or espresso machines. In many corresponding systems, the portion capsule is brought into a brewing module that includes a brewing chamber, in a direct manner by the user. The brewing chamber is subsequently closed manually whilst using an operating lever or automatically via an electrical drive. As a rule, the portion capsule is pierced at two opposite sides during the closure. Then, in the actual brewing procedure, an extraction fluid, often hot water, is introduced at the one side and the extraction product is led out at the second side. After the brewing procedure, the brewing chamber is manually or automatically opened again and the spent portion capsule is ejected into a capsule container without any further action on the part of the user.

It is particularly automated solutions of the just described preparation of a drink whilst using a portion capsule that have the problem that an absent portion capsule or one that is incorrectly inserted into the brewing module or the presence of a foreign body, which has gotten into the brewing chamber either by chance or as the result of frequent use or a preceding brewing process, cannot be directly ascertained without additional measures.

Similarly posed problems also occur with fully automatic drinks preparation machines that are not based on portion capsules. WO 2008/105017 A1 shows a method, with which one can ensure that the correct quantity of coffee powder is always automatically delivered into the brewing chamber. This method is based on measuring the electricity consumption of the electrical drive, with which drive the brewing chamber is closed, and on an adaptation of the filling quantity, which is based on this consumption, in the subsequent brewing procedure. Furthermore, an alarm value for the electricity consumption is provided. The electrical drive stops as soon as this alarm value is reached on closing the brewing chamber, and the brewing chamber is discharged without a brewing procedure having taken place.

However, solution approaches as are applied with fully automatic drinks preparation machines, which are not based on portion capsules cannot be conferred upon drinks preparation machines with portion capsules without further ado. For example, the use of a portion capsule leads to the pressure not rising in a constant manner on closing the brewing chamber. Furthermore, the brewing chambers are designed differently and have additional components, for example for piercing the portion capsule and for introducing and discharging a fluid out of this. Furthermore, the portion capsule can only be inserted into the brewing chamber and ejected out of this again as a whole.

EP 2 608 705 B1 discloses a motorised drinks machine that uses portion capsules and which, apart from the so-called activation devices—the "motor", the "transmission device" between the motor and a movable subassembly and the "water feed device"—also includes a control device that measures an electric parameter, for example the current uptake of the motor closing the brewing chamber, compares this measurement to a reference as a function of time and on the basis of this comparison stops or throttles the motor given too high a deviation. The disadvantage of this is the proneness to error, which is to be expected in the case of contamination or the like.

SUMMARY OF THE INVENTION

It is therefore the object of the invention to provide a device that overcomes the disadvantages of the state of the art. In particular, it is the object of the invention to provide a drinks preparation machine that reliably reacts to malfunctions and/or irregularities during the brewing procedure based on a portion capsule, and moreover permits a suitable reaction in the case of a malfunction, for example by way of assisting or instructing the user on correcting the malfunction.

A drinks preparation machine of the type according to the invention is designed as a drinks preparation machine for preparing a drink, in particular a hot drink such as coffee or tea, from a portion capsule.

The drinks preparation machine includes a housing, a capsule insert opening, a first and a second brewing module part, an electrical drive as well as a control.

The housing includes a capsule insert opening. A portion capsule can be brought into the drinks preparation machine, in particular into a brewing position, via the capsule insert opening.

Supplementarily, the housing can optionally include a closure for the capsule insert opening, the closure completely covering the capsule insert opening from the outer side of the housing in the closed condition. The closure can be designed as a slide that moves along the housing or as a lever arm that moves predominantly perpendicularly to the housing. It can serve as a security element for preventing foreign bodies from getting through the capsule insert opening into the drinks preparation machine and/or as a shielding against contamination and light. The latter is important concerning the application of optical elements, for example for capsule recognition.

The second brewing module is movable relative to the first brewing module. The movement of the second brewing module is driven by the electrical drive and is regulated by the control. The first and the second brewing module part are designed in a manner such that they form a brewing chamber given a certain position relative to one another, the brewing chamber at least partly surrounding the portion capsule, which is located in the brewing position during the brewing procedure, and being configured, by way of introducing an extraction fluid, in particular a brewing fluid, into the portion capsule, to produce or brew an extraction product, in particular a brewed drink and to discharge this from the portion capsule.

The control is further configured to determine a current position of the second brewing module part relative to the first brewing module part, and specifically not only at the end positions, as is known from the state of the art, but also therebetween, i.e. at all times in normal operation. This can be effected by way of counting the number of steps, by which the electrical drive has moved the second brewing module part relative to the first one.

In particular, the second brewing module part can assume a multitude of positions or a continuum of positions between the end positions, relative to the first brewing module part. For example, the second brewing module part can assume more than 10, in particular more than 100 or more than 500 positions relative to the first brewing module part. Per step, the second brewing module part changes its relative position to the first brewing module part by one position towards the first brewing module part or by one position away from the first brewing module part. On account of this, it is possible for the control to determine the current position of the second brewing module part relative to the first brewing module part at all times, in particular by way of counting steps.

In particular, the end positions can be given by a position, in which the brewing chamber is formed, and by a position, in which the first and second brewing module part are located at a maximum distance to one another, the distance being given by the construction manner of the brewing module.

In particular, such a counting of the steps is based on a signal that is generated from the feed of the electrical drive (stepper motor activation pulses), by way of the effective rotation of the motor or parts that are fixedly connected thereto (rotation pulses) or by the positional change of the second brewing module part or components which are fixedly connected thereto.

The signal can be produced, for example, by a Hall sensor, which outputs the revolutions of the electrical drive as rotation pulses.

The signal, upon which the relative position is based, represents a change of the relative positions of the second brewing module part in discrete steps, i.e. the generated signal does not change until the mentioned relative position changes by a certain value.

In embodiments, the control further includes a measuring device that is configured to continuously, for example possibly with each step, measure a parameter that characterises the power uptake of the electrical drive, in particular the electricity consumption.

In embodiments, the control is supplementarily designed to compare the measured parameters with a first comparative value. As to whether a stop condition is fulfilled is determined by way of the comparison. In particular, the stop condition is fulfilled given the presence of a malfunction of the drinks preparation machine, which could lead to a danger to the user, for example by way of an uncontrolled exit of hot water, to damage to the machine (specifically the drive) and/or to an inadequate result of the brewing procedure. The electrical drive is immediately stopped by the control if the stop condition is fulfilled.

In embodiments, the control is further configured to determine whether the stop condition has been fulfilled at a position of the second brewing module part that is characteristic of a brewing procedure or whether the fulfilment of the stop condition is due to a malfunction of the drinks preparation machine. In particular, a portion capsule that is incorrectly positioned in the brewing module represents a malfunction, which leads to a fulfilling of the stop condition.

Examples of characteristic positions are an open position, a closed position, a park position or a service position. The various characteristic positions are positions relative to the first brewing module part that are characteristic of the brewing procedure or of an error correction.

If the second brewing module part is located in the open position, then the portion capsule, by way of a user or—for an automated insertion or in commercial operation—by way of an introduction device, can be brought via the capsule insert opening into a position between the first and the second brewing module part, from which position this capsule can be automatically brought into the brewing position with a low probability of a faulty positioning.

In the closed position, the second brewing module part together with the first brewing module part forms the mentioned brewing chamber. In an embodiment of the first and second brewing module part, these are in direct contact with one another in the closed position. Alternatively, the closed position can also be defined by way of the portion capsule bearing extensively and snugly on the two surfaces of the first and second brewing module part, said surfaces lying directly opposite one another.

The part position is assumed by the second brewing module part when a brewing procedure is completed and a further capsule, although able to be inserted into the machine, should not yet get into the brewing chamber (for example, because a capsule recognition step is yet to take place, for example according to the European patent application 14 195 680.5). Supplementarily, in the park position, a portion capsule, which, after the brewing procedure, or after assuming a closed position which precedes the park position, is located between the first and the second brewing mould part, can be ejected to the bottom into a capsule container by way of the action of gravity.

An optional service position can be provided, in order to ensure an as good as possible accessibility to the relevant parts in the case of operational malfunctions. In particular, it can be selected such that a portion capsule, which is located between the first and the second brewing module part, can be removed through the capsule insert opening.

In an embodiment, the first comparative value corresponds to a value that may not be exceeded by the parameter of the electrical drive that is measured by the measuring device, thus for example a maximal electricity consumption.

Supplementarily, a comparison with a second comparative value can take place, the second comparative value being smaller than the first comparative value and to which the measured parameter is likewise compared, for example for each step. This second comparative value is smaller than the first comparative value, and an exceeding of the second comparative value does not necessarily lead to a stopping of the electric drive. In contrast, a warning signal is generated on exceeding the second comparative value given a simultaneously falling below the first comparative value. Events on operation of the drinks preparation machine of the initially described type that do not necessarily have to result in an intermediate interruption of the brewing procedure can be determined by way of this.

Supplementarily, with each transmitted warning signal, the position of the second brewing module part, at which position the warning signal has occurred, is determined and possibly compared to a list which includes positions of expected events.

A window, in which the measured parameter is compared to a second comparative value, is limited to a region that is smaller than the region that is necessary for the movement of the second brewing module part from one characteristic position into another characteristic position. This prevents the production of warning signals directly before assuming a characteristic position (open position, closed position).

In an embodiment of the drinks preparation machine, this further includes a data memory. Each value of the parameter of the electric drive which is measured by the measuring device, as well as the detail of the position of the second brewing module part, at which position the value was measured, can be stored in this data memory. A measurement curve, which represents the measured parameters of the electric drive in dependence of the position of the second brewing module part, can be generated by way of this.

The data memory can be part of the control.

Supplementarily, the measured parameters can further be compared to the second comparative value after each step, and warning signals, which result therefrom, can likewise be stored.

Supplementary, the control of the drinks preparation machine can be configured to determine maxima in the stored measurement curve, the maxima lying above the second comparative value but below the first comparative value, as well as the positions of the second brewing module part, at which these maxima have occurred.

The determining of the maxima can be limited to a part-region of the measurement curve, or to a part region of the positions which are assumed by the second brewing module part. For example, one can prevent maxima, which relate to the assumption of a characteristic position being noted as unusual events, by way of setting such an evaluation region.

Concerning a drinks preparation machine for a portion capsule, as a rule, the portion capsule is pierced on two opposite sides during the closure of the brewing chamber. The piercing of the first side serves for introducing an extraction fluid into the portion capsule. The piercing of the second side serves for leading the extraction product out of the portion capsule.

This piercing of the portion capsule can be an event of the previously described type, and the comparative value can be selected such that a piercing of the portion capsule is detectable. Given such a selected second comparative value, the drinks preparation machine or the control can be configured to determine the piercing of the portion capsule beyond the position, at which the associated maximum occurs. Supplementarily or alternatively, the value of the measured parameter, which occurs on piercing, can be used in order to identify the piercing and possibly isolate this with regard to another event.

Supplementarily, the presence or the non-occurrence of a maximum, which is caused by the piecing of the portion capsule, can be used in order to determine whether a portion capsule is inserted or not.

The drinks preparation machine can be configured to carry out different functions after fulfilling a stop condition of the type mentioned above. In particular, these functions can be carried out individually or in combination. The execution of individual or several of these functions can be directed to bringing the drinks preparation machine back again into normal operation, after the stop condition has been fulfilled on account of a malfunction of the drinks preparation machine, in particular on movement of the second brewing module part. These functions include:
the interaction with the user, for example via a display or via other optical means such as LEDs, in order to inform the user about actions which are to be undertaken;
the determining of the filling level and/or the position of one or more components of the drinks preparation machine that are not an integral constituent of the brewing chamber, which is formed via the movement of the second brewing module part. This determining includes, for example, the examining of the filling level in a capsule container, in which the spent portion capsules are collected, or the determining of the position of the closure of the capsule insert opening. The former can serve for determining whether a full capture container has prevented or could prevent the capsule ejection. In particular, the determining of the position can also include a recognition as to whether the condition has at least briefly changed after information is given to the user. This can serve for determining whether the user has carried out an action or not.
the starting of the initialisation routine, within which different characteristic positions of the second brewing module part are to be moved to according to the initialisation routine.
the determining as to whether, on moving to the different characteristic positions, in particular given a moving-to (approach) according to the initialisation routine, a malfunction or an event occurs, to which one does not need to react with an immediate stopping of the electric drive and whether such a malfunction or such an event occurs twice successively without the drinks preparation machine, between these two occurrences, having left the initialisation routine, by way of which the different characteristic positions of the brewing module part are moved to. For example, the cause and the location of the malfunction can be restricted given a first moving to the characteristic positions. Measures can be initiated on the basis of this, for example the moving to a certain position, or the user can be requested into a certain action. Given a second moving to the characteristic positions, one can therein determine whether the cause of the malfunction or the event could be overcome.

Examples of events, to which one does not need to react with an immediate stopping of the electric drive are: the sliding of a portion capsule into a guide means from an only approximately correct position, smaller residues from previous brewing procedures, deposits, or the piercing of a portion capsule.

In an embodiment, the electric drive includes a stepper motor. The control is then designed to count the steps executed by the stepper motor, in order to determine the position. In particular, the control can fall back on operating signals of the activation of the stepper motor for counting the steps. For example, the switching between the individual windings of the stepper motor or changes in the phase current can be detected. The number of counted steps since leaving a characteristic position in turn codes the current relative position of the second brewing module part.

In an embodiment of the drinks preparation machine—in particular if the drive has no stepper motor—this further includes a rotary encoder or another solid gauge. In embodiments with a rotary encoder, the change of the position, which is monitored by the rotary encoder, by a certain value (by one step), is indicated by way of transmitting a signal, in particular a pulse, or by way of an intensity change. Herein, the control is designed so as to count the transmitted signals. The number of transmitted signals since leaving a characteristic position in turn permits the determining of the current relative position of the second brewing module part. The use of a solid gauge with a coding of the absolute position is also possible.

In an embodiment, the drinks preparation machine moreover includes a capsule recognition module that is configured to detect for example optical characteristics of the portion capsule and, on the basis of this, to recognise whether a portion capsule is brought into the drinks preparation machine and which type of portion capsule it is. In particular, on the basis of a recognised coding of the capsule, one can determine whether it is a coffee Lungo capsule or an espresso capsule or possibly a cleaning or decaling capsule, by way of the capsule recognition module. Supplementarily, by way of the capsule recognition capsules, one can determine which type of coffee (or tea) is to be prepared using the introduced portion capsule.

The capsule recognition module can be arranged in the drinks preparation machine in such a spatial manner that a portion capsule that is introduced into the drinks preparation machine via the capsule opening firstly crosses through the capsule recognition module before it gets into the brewing module, or into the region between the first and the second brewing module part. Such a construction is described in the European patent application 14 195 680.5, which is explicitly referred to here.

The capsule recognition module can include:
- an optical sensor, in particular a camera, for detecting optical characteristics of the portion capsule, the capsule being located at a capsule recognition position;
- a capsule recognition window of a transparent material between the capsule recognition position and the camera;
- a fan for producing an airflow at the side of the capsule recognition window, which is situated towards the capsule recognition position;
- a light source for illuminating the portion capsule at the capsule recognition position, wherein the light source is arranged at the side of the capsules recognition window towards the optical sensor; and/or
- a diffuser for light produced by the light source.

A method for operating a drinks preparation machine that prepares of drink from a portion capsule and concerning which the brewing chamber is formed by the moving of a second brewing module part relative to a first brewing module part, the movement being caused by an electric drive, in particular a drinks preparation machine of the previously mentioned type, includes the following steps:
- determining whether the second brewing module part correctly moves to one or more positions that are to be moved to during the method, on the basis of the measured position. The positions that are to be moved to in a correct manner in particular are the closed position as well as possibly the further characteristic positions "open position", "park position" and/or "service position" which have been described beforehand. If a correct moving to the closed position has been determined, then the method for operating the drinks preparation machine can be configured to start the brewing procedure. The drinks preparation machine can further be capable of carrying out different brewing procedures, for example a standard brewing procedure for coffee, an espresso brewing procedure or a tea brewing procedure.
- stopping the electrical drive and starting an initialisation routine for bringing the drinks preparation machine back into the normal operation, should a position not have been moved to in a correct manner. The stopping of the electrical drive can thereby be activated by the fulfilment of a stop condition of the previously described type, which means results from a comparison between a first comparative value with a measured parameter of the electrical drive.

In an embodiment, the method further includes the following steps individually or in combination:
- recognising whether a portion capsule has been inserted into the capsule insert opening. The recognition can thereby be effected via a capsule recognition capsule of the previously described type. Alternatively, it is also possible to determine the presence of a portion capsule from the occurrence of current uptake peaks in the already described manner.
- recognising the type of the inserted portion capsule, in particular by way of using a capsule resignation module of the previously described type.
- restricting the operating modes, which can be selected by the user and which can be assumed by the drinks preparation machine, in dependence of whether a portion capsule has been recognised and/or in dependence of the recognised portion capsules type. Examples of operating modes that can be assumed by the drinks preparation machine are: carrying out different brewing and cleaning procedures (for example, rinsing or descaling) or carrying out a warming-up functions (for example, heating plate for preheating the drinks vessel). The restriction can lie in only a part of all operating modes, which can be assumed by the drinks preparation machine being selectable by the user. Furthermore, the method for operating a drinks preparation machine can be designed in a manner such that an operating mode is automatically assumed on the basis of the recognised portion capsule type or of the determined absence of a portion capsule.

In embodiments for drinks preparation machines with an initialisation routine, the method also includes one of the following steps which belong to the initialisation routine:
- determining the condition of one or more components of the drinks preparation machine. The components and their conditions in particular are the filling level of a capsule container and of the position of the closure.
- informing the user about one or more actions which are to be undertaken. Such actions can serve, for example, for removing a portion capsule from the capsule insert opening or from the region between the first and the second brewing module part, for emptying the capsule container, for closing the closure or for contacting a service hotline.
- determining whether the user has carried out one of the actions, for example by way of determining whether the condition of a component has at least temporarily changed.
- moving of the second brewing module part to different positions. The positions to be moved to are in particular the open and the closed position.
- determining whether the various positions can be correctly moved to. The latter is effected in particular by a previously described manner.
- determining whether events of the previously described type occur, in particular by way of the comparison of a parameter of the electrical drive with a second comparative value.
- completing the initialisation routine and the return of the drinks preparation machine into normal operation, in the case that the different positions can be been correctly moved to and no events can be determined.
- determining whether a position has not been correctly moved to for the first time within the initialisation routine. If a position is not moved to correctly twice within the initialisation routine, then this is an indication that the error cannot be overcome without external action, for example by the user

BRIEF DESCRIPTION OF THE DRAWINGS

Embodiment examples of the invention are hereinafter described by way of the figures. In the figures, the same reference numerals indicate the same or analogous elements. There are shown in:

FIG. 1 a sectioned representation of a brewing module in the open position, with an attached capsule recognition module;

FIG. 2 an exploded representation of the brewing module with an attached capsule recognition module according to FIG. 1 (without some of the housing parts);

DETAILED DESCRIPTION OF THE INVENTION

Figure 3:
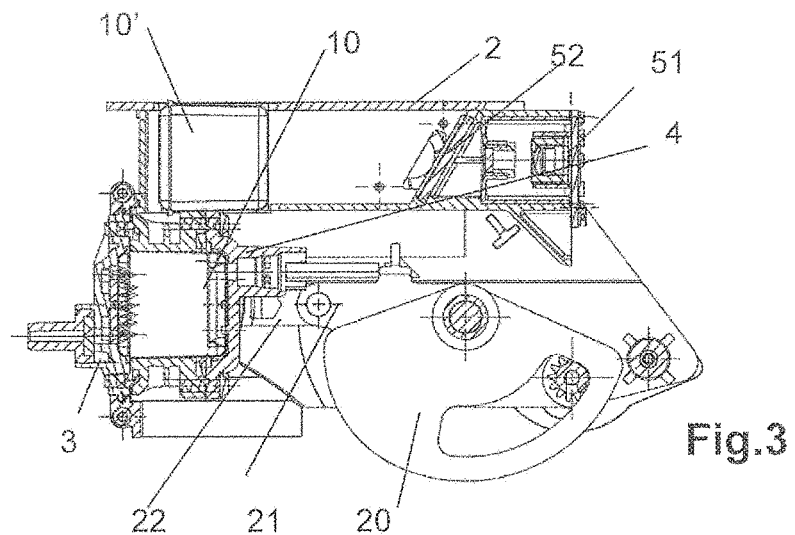
FIG. 3 a brewing module in the closed position with an attached capsule recognition module.

The brewing module part 1 according to FIGS. 1 and 2 includes an external housing 2. In the represented embodiment example, this consists of an upper housing part, which includes the capsule recognition module 5, and of a lower housing part, which carries the brewing module parts. A first brewing module part 3 (also called discharge device) and a second brewing module part 4 (also called injector) are moveably guided relative to one another in the lower housing part.

The second brewing module part 4 includes perforation elements for piecing a portion capsule 10 that can be brought into the brewing module 1 via the capsule insert opening 11 and is at least partly filled with an extraction material, for example ground coffee. The second brewing module part 4 is configured to bring a fluid—for example hot water—through the perforation element or past these into the pierced portion capsule 10, wherein the water can be fed via a water feed 12, which, for example, can include a flexible tube.

The first brewing module part 3 in the embodiment example, which is described here also includes perforation elements, specifically extraction-side piercing tips 39. These can be designed, for example, as is described in the patent application PCT/CH2014/000134 or in WO 2010/118544 or can have a different design, and the use of principles other than piercing tips, for example with grating-like structures, are also possible.

The first brewing module part 3 on both sides of the portion capsule 10 further includes guide means 31 that project towards the second brewing module part 4, as are described for example in the application PCT/CH2014/000138, the content of which relating to the manner of functioning of these guide means 31 as well as of respective retrieval means of the second brewing module part 4 are expressly referred to here.

As is known per se, for preparing a brewed drink, a portion capsule 10 is placed between the first brewing module part 3 and the second brewing module part 3, and these are moved to one another such that a brewing chamber encompassing the portion capsule 10 is formed between these. The hot water is fed under pressure through the second brewing module part 4 to the portion capsule 10, and the extraction product flows through the first brewing module part 3 via a drinks outlet 13 into a drinks vessel, which, for example, is placed therebelow.

The relative movement of the second brewing module part 4 to the first brewing module part 3 in the embodiment example described here is achieved by way of the first brewing module part 2 being assembled in a manner in which it is fixed to the housing, whereas the second brewing module part 4 is movable along the horizontal axis. The drive of the second brewing module part is effected via a toggle lever driven in a motorised manner. A pinion shaft 24, which is in connection with an electric motor (not visible in the FIGS. 1 and 2, for example covered by a drive housing 25), drives a toothed drive disc 20, which is connected to a first toggle lever arm 21 in a rotationally fixed manner, so that a pivoting movement of the drive disc 20 about its axis 26 pivots the first toggle lever arm 21 likewise about this axis 26. A second toggle lever arm 22 is connected at one side to the first toggle lever arm 21 via a toggle lever bolt 23 and at the other side interacts with a guide pin 41 of the second brewing module part 4. Since the second brewing module part 4 is mounted by the housing 2 such that it is only linearly displaceable along the essentially horizontal axis, a pivoting movement of the drive disc 20 and of the first toggle lever arm 21 therefore effects a stretching or sharp bending of the toggle joint, which is formed by the toggle lever and, on account of this, a linear displacement of the second brewing module part 4.

A capsule recognition module 5 with a camera sensor 51, a lens 59, a diffuser 53, a diffuser widow 54, a diffuser window holder 55, a capsule recognition window 52, a light source 62 as well as a fan 70, which is connected via a ventilation inlet is attached above the brewing chamber unit with the first brewing module part 3 and the second brewing module part 4. Such a capsule recognition module 5 is described for example in the application EP 14195680, whose content regarding the manner of functioning of this capsule recognising module 5 is expressly referred to here.

FIG. 3, apart from the open position, shows a further position of the second brewing module part 4 that is characteristic of the brewing procedure. Here, it is the closed position, in which the two brewing module parts form a brewing chamber, which, given a brewing procedure at least partly surrounds a portion capsule 10, which is located in the brewing position. Furthermore, a second portion capsule 10', which cannot get onto the brewing module due to the position of the second brewing module part 4, but is held in the capsule recognition module 5, is further shown in FIG. 3.

Figure 4:
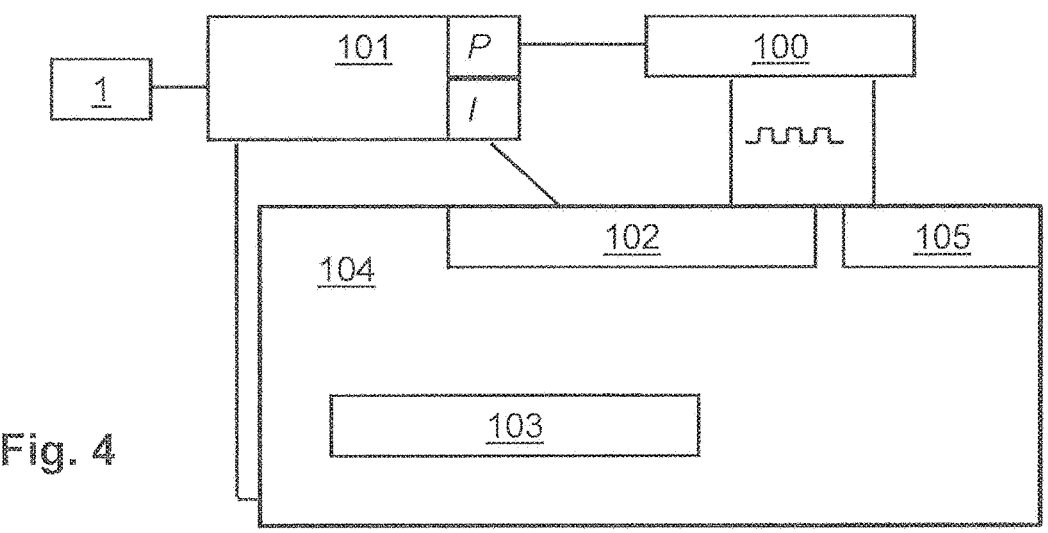
FIG. 4 a schematic representation of a drinks preparation machine with brewing module parts that are machine-driven and which are secured against malfunctions on moving the brewing module parts.

FIG. 4 schematically shows how a drinks preparation machine, which includes a brewing module 1 with an automated closure of the brewing chamber, as is shown for example in FIGS. 1-3, can be additionally secured against a malfunction, which could lead to a danger to the user or to the drinks preparation machine. The drinks preparation machine includes a pulse generator 100, which, after a certain advance P (one step) of the electrical drive 101, transmits a signal as a trigger signal to a measuring device 102 of a control 104. The pulse generator can be part of an electrical drive, which is based on a stepper motor or a rotary encoder. For example, the electrical drive 101 can be a DC motor, to which a Hall sensor as a pulse generator is connected, the generator outputting the revolutions of the motor.

The measuring device 102 reads out the currently present current uptake I of the electrical drive 101 with each signal change. The control compares the read-out value with the first comparative value 103. If the measured current uptake I exceeds the first comparative value 103, then the control 104 activates the electrical drive 101 or the pulse generator 100 to immediately stop.

In the shown embodiment, the signal that is transmitted by the pulse generator 100 per step is an individual pulse. In order to derive a positional detail from this, the control 104 includes a counter 105 that sums the number of pulses between the departure of the second brewing module part from the open position and the exceeding of the first comparative value 103 by the measured current uptake I. From the sum of pulses that results from this, it can be simply determined whether the first comparative value 103 has been exceeded due to the second brewing module part 4 pressing against the first brewing module part 3 or whether the second brewing module part 4 is not yet in direct contact with the first brewing module part 4. In the first case, the brewing chamber is correctly closed and the brewing procedure can be continued without delay. A malfunction is present in the second case and the drinks preparation machine automatically interrupts the brewing procedure.

Figure 5:
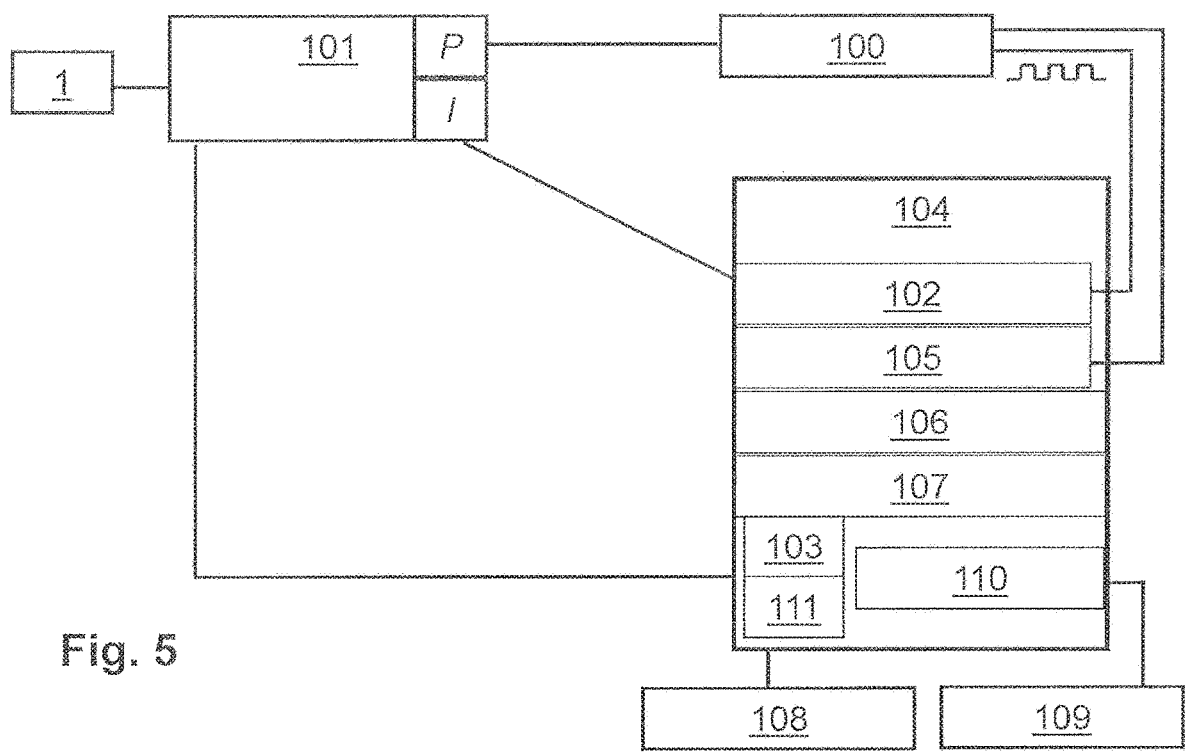
FIG. 5 a schematic representation of the manner of functioning of a drinks preparation machine according to FIG. 4 with additional functions.

In FIG. 5, the securing of the drinks preparation machine according to FIG. 4 is extended by elements that lead to an error recognition as well as error correction. Furthermore, these elements are designed such that events in the brewing procedure that do not need to result in an immediate stoppage of the electric drive can be determined.

For this, the drinks preparation machine includes a data memory 106. The data memory 106 can be applied to two different types of registration of errors and events. In a first application type, the measuring device 102 compares the current uptake I of the electric drive 101, which is read out at each signal change, with a second comparative value 111. In the case that the comparison presumes an event, the measuring device 102 initiates the transfer of the counter count to the data memory 106 and possibly itself transmits the measured current uptake to the data memory 106. An evaluation routine 107, which is integrated into the control 104, then assigns specific events such as, for example, the piercing of the portion capsule 10, to the stored values and outputs a warning in the case that stored values that cannot be assigned are present or if values that are characteristic of an developing malfunction are present. The latter can be caused for example due to contamination.

In a second application type of the data memory 106, each current uptake of the electric drive 101, which is read out by the measuring device 102, is linked to the counter count that is valid on reading out, and is stored. A curve is therefore generated and stored, and this curve represents the current uptake in dependence of the counter count. The evaluation routine 107 then analyses the stored curve. In particular, an analysis can be carried out on the basis of maxima and the associated counter counts analogously to the first application type.

In the shown embodiment, the data memory 106 as well as the evaluation routine 107, as well as the previously mentioned counter 105 and the previously mentioned measuring device 102 are integrated into the control 104, which is designed as a central control unit of the drinks preparation machine.

Furthermore, sensors 108, which serve for example for monitoring filling levels and temperatures as well as the position of components such as a closure or a capsule container, are connected to the control 104. Furthermore, the control 104 is connected to a display 109, via which the drinks preparation machine can communicate with the user, for example when it is the case of making a selection, or in order to instruct the user with a view to an error correction.

The interaction with the user that takes place via the display 109 takes place within the framework of one or more programs 110, which are likewise deposited in the control 104 of the drinks preparation machine.

Figure 6:
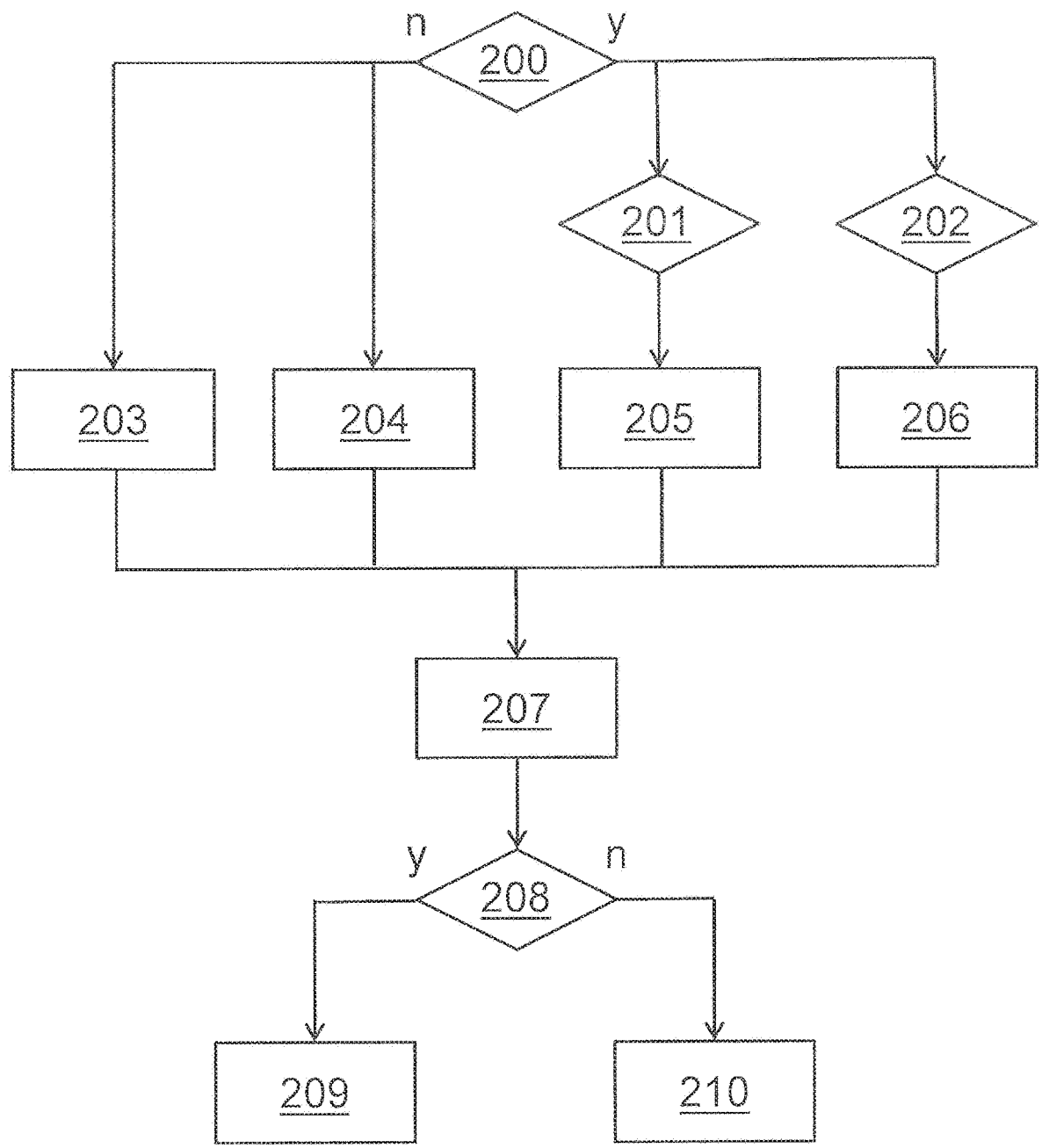
FIG. 6 a block diagram of a method for operating a drinks preparation machine.

FIG. 6 schematically shows a method for operating a drinks preparation machine. The method takes its course within the framework of a program which is stored in the control 104. In the embodiment of the drinks preparation machine which corresponds to the method according to FIG. 6, this includes a capsule recognition module 5 which includes a camera sensor 51, as is shown in FIG. 1.

The shown method for operating a drinks preparation machine includes the following steps:

recognising 200 a portion capsule 11, which is introduced via the capsule insert opening 11, by the capsule recognition module 5;

if a portion capsule 10 has been recognised, determining 201 whether it is the case of a portion capsule for coffee or the identification 202 of a cleaning capsule;

if a portion capsule for coffee has been determined, enabling 205 a possibility of starting the coffee preparation by the user. The enabling 205 can include a selection between different preparation processes, for example for espresso or cappuccino;

if a cleaning capsule has been identified, activation 206 of an operating element, which permits the user to start the cleaning process;

if no portion capsule 10 has been recognised by the capsule recognition module, enabling 203 the possibility of preheating drinks vessels and/or activation 204 of an operating element, via which the user can start a process for descaling the drinks preparation machine;

controlled closing 207 of the brewing chamber 207, before a process that is initiated by the user, in particular a process for coffee preparation, a cleaning process or a descaling process starts. The controlled closing 207 in particular includes a summing of the number of pulses between the departure from the open position by the second brewing module part 4 and the exceeding of the first comparative value 103;

comparison of the counted number of pulses with a value region that includes the setpoints for a correct closing of the brewing chamber;

beginning 209 the process that is selected by the user, should the counted number of pulses show that the brewing chamber has correctly closed;

outputting an error notice and starting 210 an initialisation routine 300 for correcting an error, should the counted number of pulses show that the brewing chamber has not correctly closed.

Figure 7:
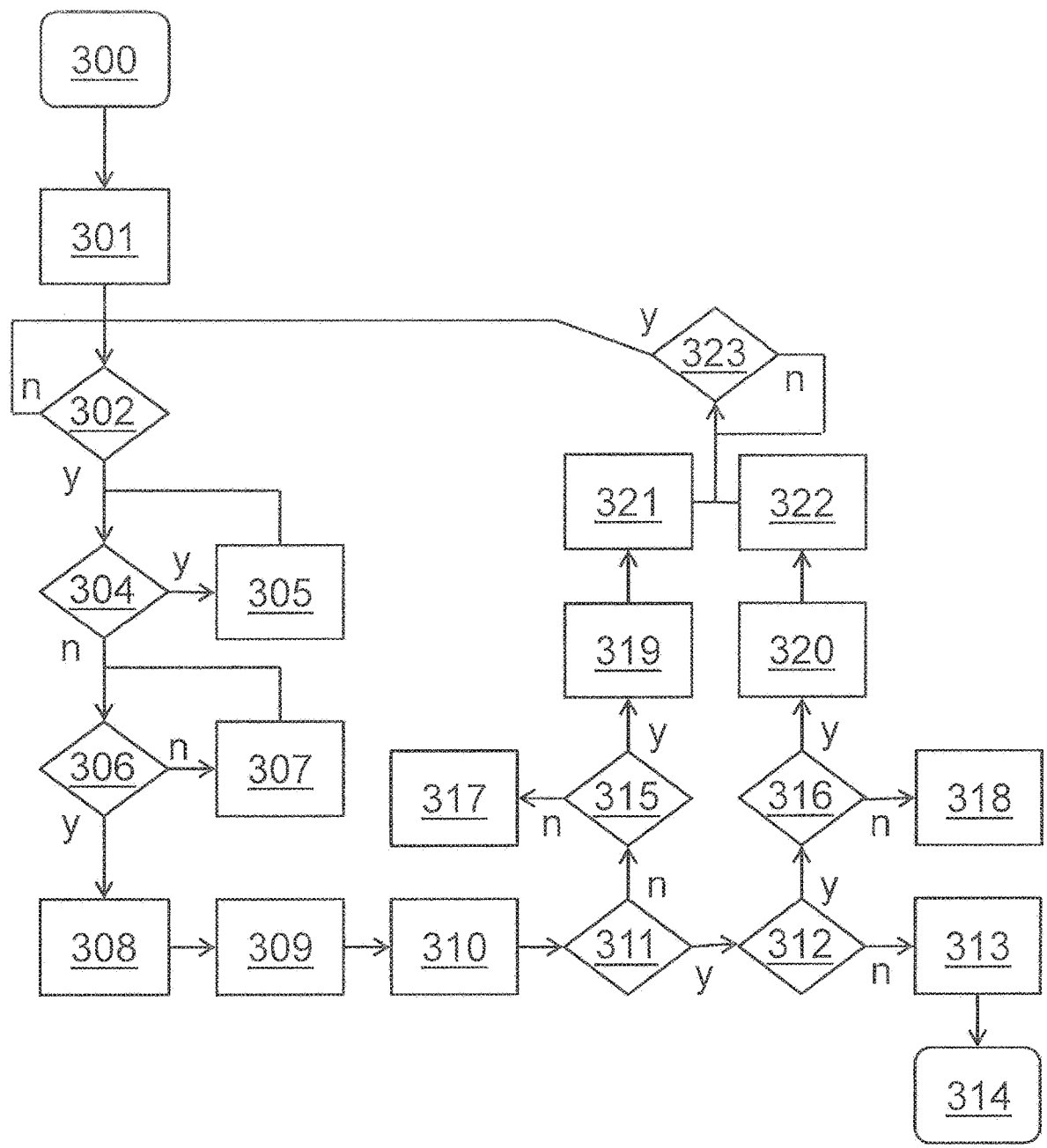
FIG. 7 a block diagram of an initialisation routine for error correction.

FIG. 7 schematically shows an initialisation routine 300 for correcting an error that occurred on closing the brewing chamber. This or similar routines can also be started with the occurrence of an error given other position changes of the second brewing module part 4, in particular on moving to the park position, as well as on starting up the machine for the first time.

At the beginning of the initialisation routine 300, the user is requested to empty 301 the capsule container, in which spent portion capsules 10 are collected. In the same step, the user is moreover requested to examine his actions, which are carried out in the run-up to the brewing procedure, for example in the run-up to the initialisation routine 300.

The drinks preparation machine subsequently examines whether it is in a condition that is suitable for a subsequent error correction. For this, the drinks preparation machine carries out the following steps:

examining 302 whether the capsule container is inserted or correctly positioned. If this is not the case, then the initialisation routine 300 waits until, in a verification 323, it has been ascertained that the closure has been opened and closed again, before a renewed examination as to whether a capsule container is inserted or correctly positioned takes place;

verification 304 that no portion capsule 10 is located in the capsule recognition module 5. If a portion capsule 10 is located in the capsule recognition module 5, then the drinks preparation machine requests the user to remove 305 the portion capsule 10 from the capsule recognition module 5;

enquiry 306 as to whether the closure is closed. If the closure is not closed, then the drinks preparation machine requests the user to close 307 the closure.

The moving 308 to the open position, followed by the setting to zero 309 of the counter 105 follow as the next steps within the initialisation routine. Furthermore, by way of moving to the open position, there is also the possibility of an incorrectly positioned portion capsule 100 possibly dropping out of the brewing module 1 into the capsule container by itself.

A moving 310 to the closed position follows. As soon as the stop condition is fulfilled, a comparison 311 of the number of pulses since leaving the open position up to the fulfilment of the stop condition takes place. If the number of counted pulses is in a region that is in agreement with a correct closing of the brewing chamber, then an examination 312 as to whether unexpected peaks in the current uptake have occurred during the transition from the open into the closed position is then effected. The examination 312 of unexpected peaks is effected via a comparison of the current uptake, which is measured during the moving 310 to the closed position, with the second comparative value 111. If no unexpected peaks occurred in the current uptake, then a moving 313 to the park position follows, by which means the drinks preparation machine is ready again for the insertion of a portion capsule 10 into the capsule recognition module 5 and the completion 314 of the initialisation routine 300.

In cases, in which the comparison 311 of the counted pulse results in an incomplete closure of the brewing chamber or in which the examination 312 of unexpected peaks in the current uptake has resulted in the same, then via an enquiry 315 as to whether the malfunction of the incomplete closure of the brewing chamber is present or via an enquiry 316 as to whether an irregularity ascertainable from the current uptake is present, it is determined whether such a malfunction or irregularly has taken place for the first time within the current initialisation routine 300. In the case that an enquiry 315, 316 results that it was not the first time, then a request 317, 318 is made to the user to contact the appliance manufacturer or a hotline.

If, in contrast, the enquiry 315 concerning the occurrence of an incomplete closure of the brewing chamber for the first times results in such a malfunction having occurred for the first time within the initialised routine 300, then a renewed moving 319 to the open position follows, followed by a request 312 to the user to examine the capsule insert opening with regard to blocking elements.

If on the other hand the enquiry 316 concerning the occurrence of unexpected peaks in the current uptake results in such an irregularity having occurred for the first time within an initialisation routine 300, then a moving 320 to a service position is effected, followed by a request 322 to the user to examine whether a portion capsule 10 is located in the brewing chamber 10 and to possibly remove this.

In order to determine whether the user has met the request 321 for examining the capsule insert opening or the request 322 for removing the portion capsule 10 from the brewing chamber, the drinks preparation machine carries out a verification 323, in which it is determined whether the closure has been opened and closed again. Should this not be ascertained, then the user is requested once again to do this.

If in contrast an opening and closing of the closure is ascertained, then the initialisation routine 300 is repeated from the step of the examining 302 as to whether the capsule container is inserted or is correctly positioned.

Figure 8:
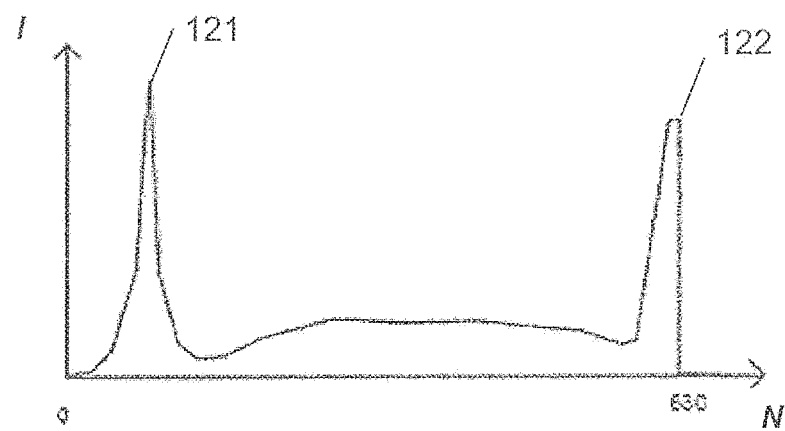
FIG. 8 a schematic curve of the current uptake in dependence of the relative position of the second brewing module part, when no portion capsule has been inserted.
Figure 9:
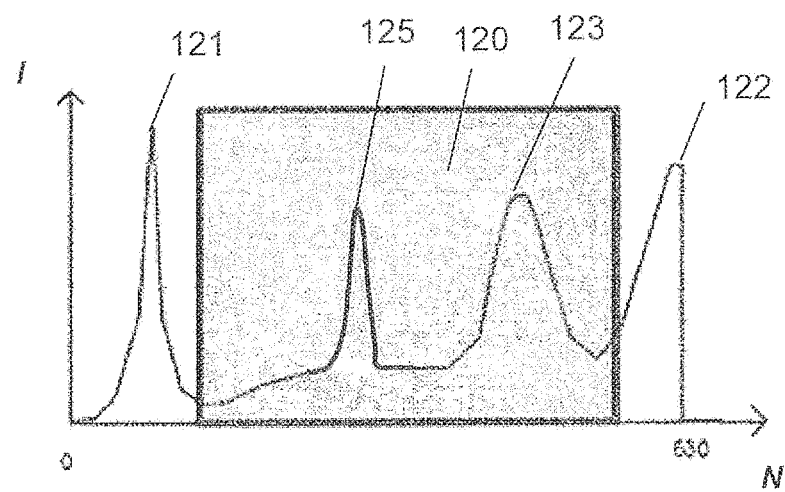
FIG. 9 a schematic curve of the current uptake in dependence of the relative position of the brewing module part given an inserted portion capsule.
Figure 10:
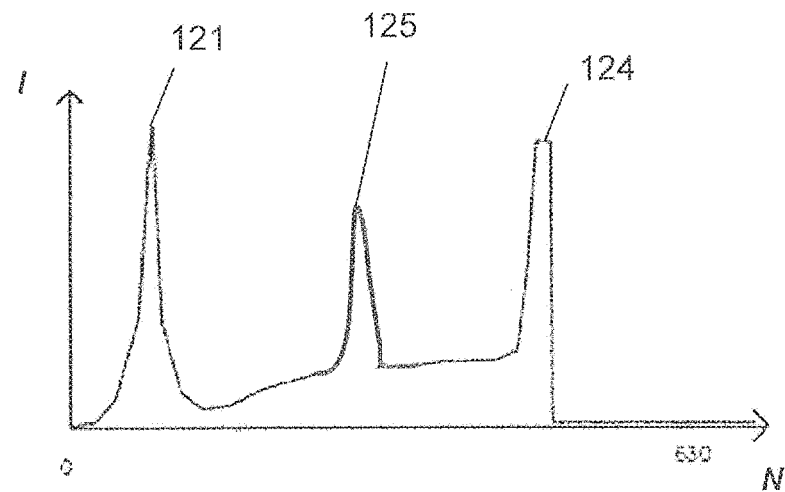
FIG. 10 a schematic curve of the current uptake in dependence of the relative position of the second brewing module part given an incorrectly inserted portion capsule.

FIGS. 8-10 show schematic curves which display the essential features of measurement curves which are stored in the data memory 106 of a drinks preparation machine which functions according to the manner of functioning which is shown in FIG. 5. What is shown is the current uptake I of the electrical drive 101 in dependence of the counter count N, i.e. in dependence of the number of registered pulses and thus in dependence of the position of the second brewing module part 4 relative to the first brewing module part 3. The start position (counter count is zero) of the second brewing module part 4 is the open position.

A first current uptake peak 121 which occurs briefly after leaving the open position is visible in FIGS. 8-10. This arises due to the start-up of the electrical drive 10 and the bringing of the second brewing module part 4 into motion, which is effected by this (start-up current).

Concerning the brewing module 1, which forms the basis of FIGS. 8-10, the second brewing module part 4 is in direct contact with the first brewing module part 3 after 630 steps of the electrical drive. The number of steps depends on the realisation of the electric drive and the way and manner in which the signal for determining a position change is generated. The direct contact, which sets in leads to the current uptake I rapidly increasing in the region around N=630, to it forming a second current uptake peak 122 and finally fulfilling the stop condition.

In order to prevent a stopping of the electrical drive 101, which is not caused by error, before the assumption of the closed position, the analysis of the current uptake curve is limited to an evaluation region 120 which begins after the first current uptake peak 121 caused by the starting-up, and ends before the second current uptake peak 122 which is caused by the first and the second brewing module part coming into contact.

FIG. 8 schematically shows the current uptake I of the electric drive 101 in dependence of the counter count N in the case that no portion capsule 101 has been inserted into the brewing module 1. In this case, the current uptake I varies only little between the first current uptake peak 121 and the second current uptake peak 122.

A portion capsule 10 is inserted correctly into the brewing module 1 in FIG. 9. Here too, the current uptake firstly varies very little after the first current uptake peak, before, in the case of drinks preparation machines, with which the portion capsule 10 gets into the brewing chamber amid the use of an insert groove, the travel of the portion capsule 10 via the insert groove leads to a third current uptake peak 125. The piercing of the portion capsule 10 leads to a renewed increase of the current uptake and to a fourth current uptake peak 123.

FIG. 10 visualises the current uptake I in the case of a portion capsule 10, which is incorrectly positioned in the brewing module 1. This sooner or later jams between the first and the second brewing module part, depending on the type of incorrect positioning of the portion capsule 10. This leads to a fifth current uptake peak 124, which finally exceeds the first comparative value 103 and thus leads to as stopping of the electric drive 101.

LIST OF REFERENCE NUMERALS 1 brewing module
2 housing
3 first brewing module part
4 second brewing module apart
5 capsule recognition module
10 portion capsule
10' second portion capsule
11 capsule insert opening
12 water feed
13 drinks outlet
20 drive disc
21 first toggle lever arm
22 second toggle lever arm
23 toggle lever bolt
24 pinion shaft
25 drive housing
26 axis
31 guide means
39 extraction-side piercing tips
41 guide pin
51 camera sensor
52 capsule recognition window
53 diffuser
54 diffuser window
55 diffuser window holder
59 lens
62 lens source
70 fan
100 pulse generator
101 electrical drive
102 measuring device
103 first comparative value
104 control
105 counter
106 data memory
107 evaluation routine
108 sensor(s)
109 display
110 program(s)
111 second comparative value
120 evaluation range
121 first current uptake peak
122 second current uptake peak
123 fourth current uptake peak
124 fifth current uptake peak
125 third current uptake peak
200 recognising a portion capsule
201 determining whether a portion capsule is for coffee
202 identifying whether it is a cleaning capsule
203 enabling a process for preheating the drinks vessel
204 activating an operating element for starting a descaling process
205 enabling an operating element for starting a drinks preparation process
206 activating an operating element for starting a cleaning process
207 controlled closing of the brewing chamber
208 comparison of the number of pulses
209 beginning a process
210 output error notice/starting initialisation process
300 initialisation routine
301 emptying the capsule container
302 examining whether the capsule container is inserted/correctly positioned
304 verifying whether the capsule container is empty
305 removing the portion capsule from the capsule recognition module
306 enquiry of the closure position
307 closing the closure
308 moving to the open position
309 setting the counter to zero
310 moving to the closed position
311 comparison of the number of pulses
312 examining for unexpected peaks
313 moving to the park position
314 completing the initialisation routine
315 enquiry concerning repeated occurrence of the malfunction
316 enquiry concerning repeated occurrence of the irregularity
317 request for getting in contact
318 request for getting in contact
319 moving to the open position
320 moving to the service position
321 request the examining for blocking elements
322 request for the removal of the portion capsule from the brewing chamber
323 verifying an actuation of the closure

The invention claimed is:

1. A drinks preparation machine for the preparation of a drink from a portion capsule, comprising:
a housing that comprises a capsule insert opening, through which the portion capsule is inserted;
a brewing module comprising a first brewing module part and a second brewing module part that is movable relative to the first brewing module part, wherein a brewing chamber is formed by the first and the second brewing module part, wherein said brewing chamber, during a brewing procedure, at least partly surrounds the portion capsule located in a brewing position, and wherein the brewing module is configured to brew a brewed drink by introducing a brewing fluid into the portion capsule and to discharge the brewed drink from the portion capsule; and
an electrical drive for a movement of the second brewing module part relative to the first brewing module part, as well as a control for controlling the electrical drive;
wherein the control is configured to determine an always current position of the second brewing module part relative to the first brewing module part.

2. The drinks preparation machine according to claim 1, wherein the control comprises a measuring device for measuring a parameter characterizing an electrical power which is taken up by the electrical drive.

3. The drinks preparation machine according to claim 2, wherein the control is configured to compare the measured parameter with a first comparative value, in order to determine whether a stop condition is fulfilled, wherein the control stops the electrical drive in the case of a fulfilled stop condition.

4. The drinks preparation machine according to claim 3, wherein the drinks preparation machine is configured, after a stopping of the electrical drive, which is caused by the fulfilling of the stop condition, to carry out at least one of the following steps:
informing a user about actions to be undertaken;
determining a filling level and/or a position of one or more components of the drinks preparation machine that are different from the second brewing module part and the electrical drive;
starting an initialization routine, within which the second brewing module part is moved to different characteristic positions according to the initialization routine; and
determining as to whether, on moving the second brewing module part to the different characteristic positions according to the initialization routine, a malfunction or an event occurs, to which the user does not need to react with an immediate stopping of the electrical drive, and whether said malfunction or said event occurs twice successively without the drinks preparation machine having left the initialization routine between said two occurrences of the malfunction and the event due to which the second brewing module is moved to the different characteristic positions;
so as to have the drinks preparation machine to go into a normal operation again.

5. The drinks preparation machine according to claim 4, wherein the control is configured to compare the measured parameter of the electrical drive with a second comparative value, wherein regarding their respective absolute values, the second comparative value is smaller than the first comparative value, and wherein the control is designed such as to generate a warning signal if the measured parameter is larger than the second comparative value but smaller than the first comparative value, in order to determine the occurrence of events during operation of the drinks preparation machine, to which a user is not to react with an immediate stopping of the electrical drive.

6. The drinks preparation machine according to claim 5, further comprising a data memory, in which, for each relative position of the second brewing module part to the first brewing module part, the measured parameter for said each relative position is stored, in order to generate a measuring curve of the measured parameter of the electrical drive in dependence of the relative position of the second brewing module part.

7. The drinks preparation machine according to claim 6, wherein the control is configured to determine maxima of the measured parameter in an evaluation region of the relative positions, said maxima being above the second comparative value but below the first comparative value, as well as to determine the relative position of the occurrence of each maximum, in order to determine the occurrence of the events.

8. The drinks preparation machine according to claim 3, wherein the control is configured to determine, on a basis of the determined position, whether the stop condition has been fulfilled at a position of the second brewing module part that is characteristic of the brewing procedure or whether the fulfilling of the stop condition was caused by a malfunction of the drinks preparation machine.

9. The drinks preparation machine according to claim 1, wherein the control is configured to count a number of steps, by which the electrical drive has moved the second brewing module part relative to the first brewing module part and to determine the current relative position from the counted number of steps.

10. The drinks preparation machine according to claim 9, wherein the steps are counted as rotation pulses or stepper motor pulses.

11. The drinks preparation machine according to claim 1, comprising a rotary encoder which, after each positional change of the second brewing module part relative to the first brewing module part by one step, transmits to the control a signal which is counted as a step, in order to determine therefrom the current relative position of the second brewing module part.

12. The drinks preparation machine according to claim 1, further comprising a capsule recognition module that is configured to recognize, on the basis of an optical characteristic of the portion capsule, whether such a capsule is brought into the drinks preparation machine and which type of portion capsule it is, wherein the capsule recognition module is arranged ahead of the brewing module and wherein a transfer of the portion capsule from the capsule recognition module into the brewing module is controlled by the position of the second brewing module part.

13. A method for operating the drinks preparation machine according to claim 1, comprising the steps of:
determining whether the second brewing module part is correctly moved to one or more positions during operation of the drinks preparation machine the method; and
stopping the electrical drive and starting an initialization routine for bringing the drinks preparation machine back into a normal operation in the a case that the second brewing module part was not correctly moved to said one or more positions.

14. The method according to claim 13, comprising the further steps of:
recognizing whether the portion capsule has been inserted into the capsule insert opening;
recognizing the type of the inserted portion capsule; and
restricting the operating modes that are selected by a user and which are assumed by the drinks preparation machine, in dependence of whether the portion capsule has been recognized and/or in dependence of the recognized portion capsule type.

15. The method according to claim 13, wherein the initialization routine comprises at least one of the following steps:
determining a filling level and/or a position of one or more components of the drinks preparation machine which are different from the second brewing module part and the electrical drive;
informing a user about one or more actions to be carried out;
determining whether the user has carried out one of the said one or
moving the second brewing module part to different positions;
determining whether the second brewing module part can be correctly moved to the different positions;
determining whether events occur to which the user is not to react with an immediate stopping of the electrical drive;
completing the initialization routine and returning the drinks preparation machine back into normal operation in a case that the second brewing module part can be correctly moved to the different positions and no events are determined to have occurred; and determining whether the second brewing module part has not been correctly moved to a position for a first time within the initialization routine.

* * * * *